UNITED STATES PATENT OFFICE,

BENJAMIN WILLIAM EDDY, OF EASTLAKE, ALABAMA.

COMPOSITION FOR ARTIFICIAL STONE.

SPECIFICATION forming part of Letters Patent No. 531,520, dated December 25, 1894.

Application filed March 26, 1894. Serial No. 505,166. (No specimens.)

*To all whom it may concern:*

Be it known that I, BENJAMIN WILLIAM EDDY, a citizen of the United States, and a resident of Eastlake, in the county of Jefferson and State of Alabama, have invented certain new and useful Improvements in Compositions; and I do hereby declare the following to be a full, clear, and exact description of the invention, such as will enable others skilled in the art to which it appertains to make and use the same.

My composition consists of the following ingredients combined in the proportions stated, viz: Metallic turnings and borings, two cubic feet; cement, one cubic foot; oxide of iron, one-fourth cubic foot; water sufficient to mix to a plastic mass. These ingredients are to be thoroughly mixed by tempering or other means of agitation.

The above named composition is to be used for various purposes, namely to make cheap weights of any description, the cost of such weights being much less than cast iron, or other substances usually used for that purpose. The composition can be used to make basement or cellar floors, it being rat and vermin proof when used for that purpose, and it is also suitable for filling burglar proof safes and vaults, and can be used to advantage in such constructions.

In using the above named composition for the making of weights, the material is prepared as follows: A quantity of metallic turnings and borings, such as is usually made in machine shops and other iron working establishments is procured. Portland, or other suitable, cement in half the quantity by measure is added to the turnings. Oxide of iron in one-fourth the quantity of cement is added. All the ingredients are mixed together by any method of agitation until thoroughly mixed, when water is added in sufficient quantity to form the whole into a plastic mass. The composition when so mixed can be molded to make weights in suitable molds to any form or shape desired. If required, a staple or eye can be molded in the material to suspend the weight, pressure or ramming being used when filling the composition into the molds, to compact the material to a firm and solid mass. The composition is allowed to stand in the mold after filling a sufficient time to set firm enough to handle. The mold is then opened and the weight turned out to dry. When dry the weights can be dipped in coal tar, or painted any color desired, to give them a uniform coating on the outside.

To make a rat or vermin proof basement or cellar floor the composition is mixed as above described. When so mixed it is laid a suitable thickness on broken rock, or on any other kind of a suitably prepared foundation. The material when laid is compacted and leveled by drawing a heavy roller over it, or ramming it with a tamper, during the time of setting before it gets too stiff or hard to pack.

To use as a filling for burglar proof safes and vaults, the composition is mixed as above described, wrought iron or steel turnings in long fibers being used exclusively for the iron proportion. When so mixed and placed in a burglar proof safe or vault, using pressure or ramming to compact the composition during the process of filling, it makes an effective filling, that when dry, it is almost impossible to drill or to get through in any manner.

What I claim, and desire to secure by Letters Patent of the United States, is—

The herein described composition of matter to be used for making weights, cellar and basement floors, and to fill safes and vaults, consisting of water, metallic turnings and borings, cement, and oxide of iron in the proportions specified.

In testimony whereof I affix my signature in presence of two witnesses.

BENJAMIN WILLIAM EDDY.

Witnesses:
JEROME A. TUCKER.
H. E. SWAN.